United States Patent [19]

Ono et al.

[11] Patent Number: 4,616,258
[45] Date of Patent: Oct. 7, 1986

[54] DEVICE FOR MONITORING THE INTERIOR OF A CONDUIT

[75] Inventors: Kimizo Ono; Yoshikazu Nishiwaki; Koichi Tsuno; Toru Iwai; Mitsuru Nishikawa, all of Osaka, Japan

[73] Assignee: Sumitomo Electric Industries, Ltd., Osaka, Japan

[21] Appl. No.: 459,554

[22] Filed: Jan. 20, 1983

[30] Foreign Application Priority Data

Feb. 1, 1982 [JP] Japan .................................. 57-15425

[51] Int. Cl.⁴ ............................................. H04N 7/18
[52] U.S. Cl. .................... 358/100; 358/108; 358/106; 138/90; 324/221; 324/233
[58] Field of Search ................ 358/100, 108, 98, 106; 138/89, 90; 73/40.5 R, 49.5; 324/219, 220, 221, 233

[56] References Cited

U.S. PATENT DOCUMENTS

| | | | |
|---|---|---|---|
| 3,761,623 | 9/1973 | Hara et al. | 358/100 |
| 3,784,740 | 1/1974 | Copland | 358/100 |
| 3,885,091 | 5/1975 | Fish et al. | 358/100 |
| 3,984,627 | 10/1976 | Galerne | 358/100 |
| 4,218,923 | 8/1980 | Triplett et al. | 73/623 |
| 4,292,589 | 9/1981 | Bonner | 324/233 |

Primary Examiner—James J. Groody
Assistant Examiner—Edward L. Coles
Attorney, Agent, or Firm—Sughrue, Mion, Zinn Macpeak & Seas

[57] ABSTRACT

A monitoring device for monitoring an interior conduit wall includes a plurality of sliding members each resiliently urged by equal amounts away from the device body toward the conduit wall, so that the device can be used in conduits of different diameters while always remaining substantially centered within the conduit.

14 Claims, 9 Drawing Figures

DEVICE FOR MONITORING THE INTERIOR OF A CONDUIT

BACKGROUND OF THE INVENTION

The present invention relates to a device for monitoring the interior of a conduit.

When a television camera is inserted into a conduit to inspect the wall of the conduit for any damage or cracks that may cause water leakage, it is desirable that the television camera be supported centrally within the conduit. Conventional television cameras for use in conduit inspection have parallel support legs attached to lower and lateral sides of the camera for supporting the camera within the conduit. FIG. 8 of the accompanying drawings is a perspective view of such a prior television camera used for conduit inspection. A television camera 50 shown in FIG. 8 is of box-shaped configuration elongated in the axial direction, and has a monitoring detector 51 on its front end. A cable 52 is led out of the rear end of the television camera 50 up to a television monitoring vehicle on the ground. Inclined leg attachment plates 53 are affixed to the bottom of the television camera 50. A pair of legs 54 are attached to each of the leg attachment plates 53 and support on their distal ends a horizontal support foot 55 having front and rear slider ends 56, 57 for slidable movement through a conduit to be monitored for inspection. The legs on such a television camera are of a fixed length.

It is desirable that the monitoring detector 51 be located on a central axis of the conduit to be monitored. Accordingly, the inside diameter of the conduit with which the television camera can be used is determined. For a different conduit inside diameter, legs of a different length matching that inside diameter should be attached. This requires replacement of the legs 54 and the support feet 55, resulting in a poor efficiency in preparing the television camera for use.

When the television camera 50 while in use in a conduit comes across a varying inside diameter, bumps, recesses, or obstacles in the conduit, the television camera 50 cannot be moved smoothly along since the fixed length of the legs make it difficult for the camera 50 to follow such irregularities in the conduit during advancing movement of the camera.

When the monitoring detector 51 is facing forward, the requirement that the television camera 50 be kept on the central axis of the conduit is less essential. However, since the monitoring detector 51 thus oriented will provide an image of the conduit wall only peripherally around its field of view, it would be difficult to make a detailed localized observation of the conduit wall. It is therefore preferable that the monitoring detector have on its front end a rotatable mirror which rotates about an axis thereof for continuously imaging the wall surface in a direction normal to the axis. A detector with such a rotatable field of view will enable a more detailed inspection of the conduit wall.

A television camera with only two support feet is relatively unstable and is in danger of turning over, since the wall of the conduit is not flat but cylindrical. To avoid such a difficulty, conduit inspection television cameras having four feet have been used. FIG. 9 is a perspective view of a known conduit inspection television camera with four feet. A television camera 60 has a monitoring detector 61 on its front end and a cable 62 on its rear end. Four pairs of front legs 63 and rear legs 64 are fixed to the television camera 60 around its circumference. Support feet 65 are fixed to distal ends of the legs 63, 64.

The television camera 60 shown in FIG. 9 is more stable since it is supported by the four feet. However, it is relatively difficult to support the monitoring detector 61 on a central axis of the conduit being inspected. Further, it is still the case that the legs 63, 64 need to be replaced for conduits of different inside diameters.

The monitoring detectors of these conventional television cameras do not have to be located on the central axis of the conduit if the detectors are directed forwardly. However, in monitoring devices having a monitoring detector facing laterally with its direction of observation rotatable, the detector lens should be spaced a constant distance from the conduit wall at all times for correct pickup and transmission of an image of the conduit wall. If the distance between the lens and mirror of the detector and the inner conduit wall changed during one revolution of the mirror for continuous observation of the inner conduit wall, then the position of the lens would need constant adjustment.

Conventional television cameras for monitoring the interior of a conduit are poor in versatility since they can be used only for those conduits of inside diameters for which they are designed. Further, even when used in a conduit having an optimum inside diameter, the television camera will have difficulty in advancing smoothly due to irregularities such as projections and recesses in the conduit wall.

SUMMARY OF THE INVENTION

It is an object of the present invention to eliminate these above-described difficulties in conventional monitoring devices.

A device for monitoring the interior of a conduit according to the present invention has at least three sliders disposed around the device body and, preferably at equal angular intervals, and means for resiliently urging the sliders radially outwardly from the device body into contact with the inner wall of the conduit. The same mechanism is preferably used to urge all of the sliders outwardly so that all sliders will be spaced equidistantly from the body, thereby maintaining the body on the center axis of the conduit regardless of the conduit diameter.

BRIEF DESCRIPTION OF THE DRAWINGS

The construction, operation and advantages of the present invention will now be described with reference to the drawings which illustrate embodiments of the invention. In the drawings.

DETAILED DESCRIPTION OF THE INVENTION

Figure 1:
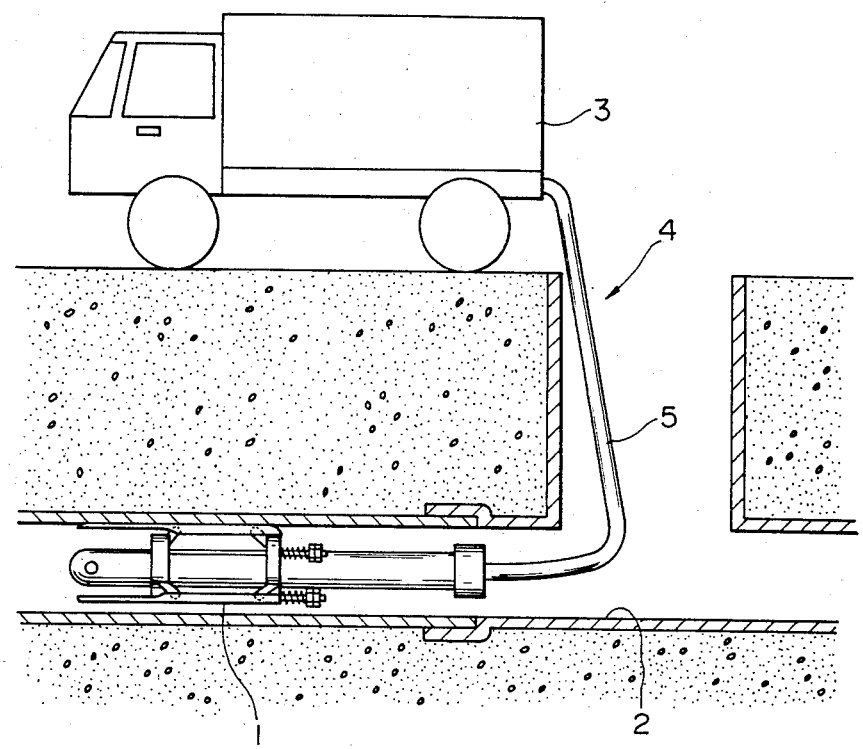
FIG. 1 is a schematic diagram of a conduit inspection apparatus employing a device for monitoring the interior of a conduit according to the present invention.

FIG. 1 is a schematic elevational view of a conduit inspection apparatus. A device 1 according to an embodiment of the present invention for monitoring the interior of a conduit is inserted, when in use, into an underground conduit 2. A cable 5 extends through a manhole 4 from a television monitoring vehicle 3 above ground and is connected to the device 1.

Figure 3:
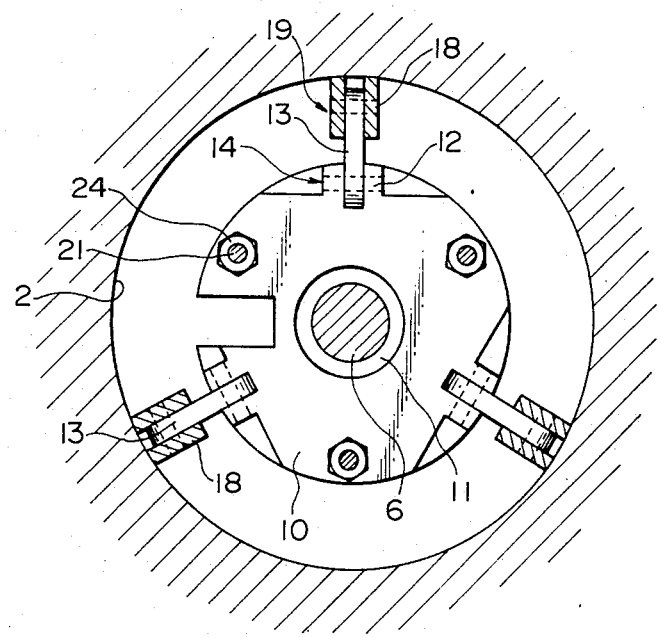
FIG. 3 is a cross-sectional view taken along line III—III of FIG. 2.
Figure 2:
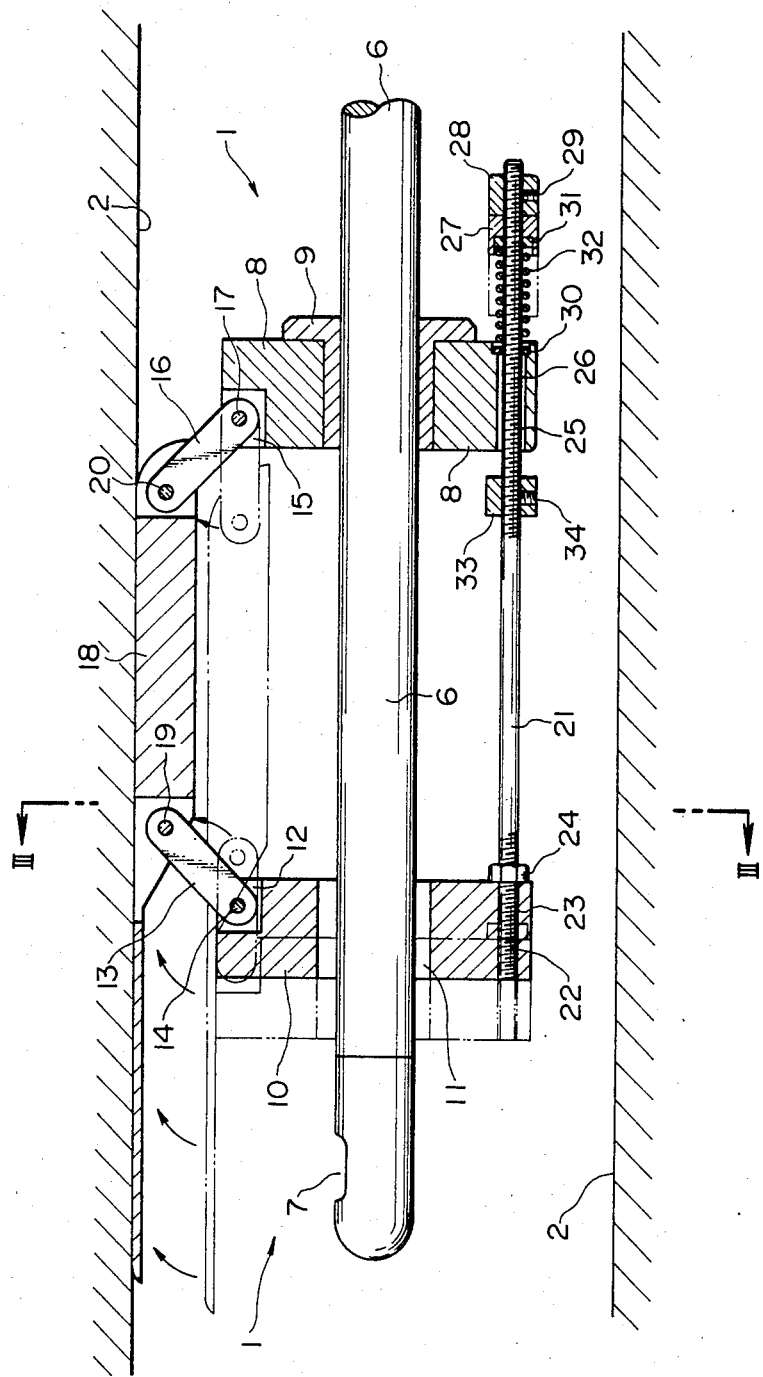
FIG. 2 is a longitudinal cross-sectional view of a device for monitoring the interior of a conduit according to an embodiment of the present invention.

FIG. 2 is an enlarged longitudinal cross-sectional view of the device 1, and FIG. 3 is a cross-sectional view taken along line III—III of FIG. 2. As shown in these Figures, a body 6 of the monitoring device is of a cylindrical shape having a longitudinal axis extending parallel to the conduit 2 and containing an optical fiber assembly comprising an illumination light transmission fiber for guiding illumination light into the conduit 2 and an image transmission fiber for transmitting an image of the inner wall of the conduit 2 to a television camera. A power line may be disposed parallel to the optical fiber assembly for supplying electric power for controlling the device 1. The optical fiber assembly and the power line are bundled together as the cable 5.

At the front end of the body 6 is an opening in which a monitoring detector 7 is mounted. Although not shown, the body 6 houses therein a suitable drive source for rotating the monitoring detector 7 and hence changing the direction of observation around the axis of the body 6.

The body 6 is supported at a rear portion thereof by an annular fixed holder 8 and a body holder ring 9. The body holder ring 9 is inserted between the fixed holder 8 and the body 6 for coupling them closely together. An annular movable holder 10 is loosely fitted over the body 6 at a position forward of the fixed holder 8 and the body holder ring 9. The movable holder 10 has a central through-hole 11 through which the body 6 extends with a clearance therebetween to allow the movable holder 10 to move freely with respect to the body 6.

The movable holder 10 has three arm attachments 12 angularly spaced at 120° intervals around its periphery. A front arm 13 is pivotably attached at one end thereof to each of the arm attachments 12 by a first pin 14. The fixed holder 8 has three similar arm attachments 15 angularly spaced at 120° intervals around its periphery, so that the arm attachments 12, 15 are thus located symmetrically with respect to the central axis of the body 6. The attachments 12, 15 are axially aligned along the central axis of the body 6. To each of the arm attachments 15, there is pivotably attached one end of a rear arm 16 by a second pin 17.

Sliders 18 in the form of elongated rods are pivotably mounted at their front and rear portions to each pair of front and rear arms 13, 16 by third and fourth pins 19 and 20, respectively, for direct contact with the inner wall of the conduit 2. A total of three such sliders 18 are provided at positions angularly spaced at 120° intervals about the central axis of the body 6. Three holder connecting rods 21 are also spaced at 120° intervals and are angularly offset by 60° from the sliders 18. These connecting rods interconnect the fixed holder 8 and the movable holder 10.

Each of the holder connecting rods 21 has an externally threaded end portion 22 threaded into an internally threaded portion 23 in the movable holder 10. The externally and internally threaded portions 22, 23 are securely fastened together by a nut 24 threaded over the externally threaded portion 22. The holder connecting rod 21 also has a rear externally threaded end portion 25 which is not secured to the fixed holder 8 but instead extends through an aperture 26 in the fixed holder 8.

A spring support nut 27 and a retainer nut 28 are threaded over the rear end of the externally threaded end portion 25. A set screw 29 is laterally threaded into the retainer nut 28 to abut against the externally threaded end portion 25. This prevents the retainer nut 28 from rotating and also secures the same to the holder connecting rod 21.

The aperture 26 in the fixed holder 8 has a rear recess and the spring support nut 27 has a similar front recess, and rings 30, 31 are fitted respectively in the rear and front recesses. A spring 32 is disposed around the holder connecting rod 21 and between the fitted rings 30, 31. The spring 32 normally urges the spring support nut 27 to move rearwardly away from the fixed holder 8, and hence resiliently urges the movable holder 10 toward the fixed holder 8. Instead of individual springs for each connecting rod, the same purpose may be served by employing a single spring which surrounds all of the three holder connecting rods.

A stop nut 33 is threaded over the externally threaded end portion 25 of the holder connecting rod 21 in front of the fixed holder 8. The position of the stop nut 33 is fixed by a set screw 34. The stop nut 33 serves to define the stroke by which the spring 32 can expand.

Although not shown, a suitable traction mechanism such as a wire is attached to the movable holder 10 or the fixed holder 8 at its front and rear ends. The device 1 can thus be moved back and forth through the conduit 2 by pulling the wire.

The device 1 for monitoring the interior of the conduit 2 will operate as follows:

When the device 1 is located outside of the conduit 2, the spring 32 is expanded to keep the stop nut 33 held against the front end of the fixed holder 8 with the holder connecting rods 21 held at rest. At this time, the movable holder 10 is closest to the fixed holder 8, and the distance between the first and second pins 14, 17 is approximately the same as the distance between the third and fourth pins 19, 20. At this time, the front and rear arms 13, 16 are raised to spread the sliders 18 radially outwardly.

When the device 1 is to be inserted into the conduit 2, the holder connecting rods 21 are fully pushed forward to displace the movable holder 10 in the forward direction. As the pins 14 and 17 are pulled away from one another, the front and rear arms 13, 16 are brought into their retracted positions to move the sliders 18 radially inwardly as shown by the dot-and-dash lines in FIG. 2. The radially contracted device is then placed into the conduit 2 and the holder connecting rods 21 are released. The movable holder 10 is now displaced rearwardly under the resiliency of the springs 32, whereupon the front and rear arms 13, 16 are raised to spread the sliders 18 radially outwardly into contact with the inner wall surface of conduit 2.

The device 1 is stably held at rest in the conduit 2 with the sliders 18 abutting against the wall surface of the conduit 2. Since the three sliders 18 are all displaced by the same mechanism, they are displaced by equal amounts from the center of the body 6, and the center of the body 6 is therefore aligned with the center of the conduit 2. In other words, the outer surfaces of the sliders 18 are equally spaced from the center of the body 6, and the point equally spaced from three different points on a circle is the center of the circle.

Since the sliders 18 are only resiliently urged against the inner wall surface of the conduit 2, the device 1 can be moved back and forth in the conduit 2 by the traction mechanism while overcoming frictional forces acting between the sliders 18 and the inner wall surface of the conduit 2. While the device 1 is being moved through the conduit 2, the body 6 is positioned on the central axis of the conduit 2 at all times.

Where the conduit 2 has different inside diameters, i.e., where a change in the diameter is encountered, the sliders 18 can tilt in conformity with an inclined inner wall portion of the conduit 2. The slider 18, the fixed holder 8, the movable holder 10, the front arm 13, and the rear arm 16 jointly constitute a quadrilateral having one side (between the first and second pins 14, 17) variable. The quadrilateral itself has a variable shape, but its shape is determined by the inner wall of the conduit 2. This allows the sliders 18 to be tilted in conformity with an inclined inner wall surface of the conduit 2 where it has an increasing or decreasing inside diameter, thereby permitting the device 1 to move along smoothly in the conduit 2.

The body 6 is always kept in alignment with the central axis of the conduit 2 while the sliders 18 slide along an inclined wall surface of the conduit 2. The sliders 18 can be displaced radially inwardly or outwardly by any bump or recess or obstacle in the conduit 2 so that the sliders 18 can move smoothly over such an obstruction.

The number of the sliders 18 can be suitably selected provided it is three or more, and they are preferably symmetrically positioned around the body 6 at equal angular intervals. The sliders 18 may also be disposed in axially spaced groups, such as two or three groups.

Where the sliders are disposed at equal intervals of one mth of a single revolution about the body 6, and are provided in n axially spaced groups, the total number N of the sliders can be given by:

$$N = m \cdot n \tag{1}$$

The embodiment shown in FIGS. 2 and 3 has m=3, n=1. The preferable limitations on m, n are expressed by the following inequalities:

$$m \geq 3 \tag{2}$$

$$n \geq 1 \tag{3}$$

Figure 4:
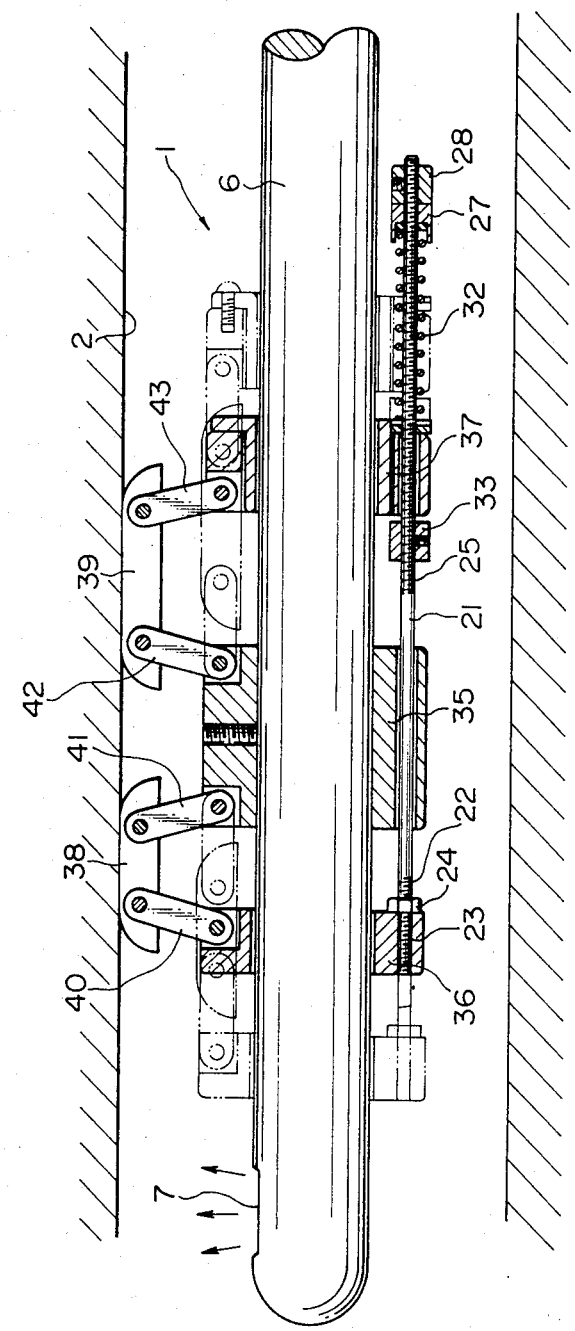
FIG. 4 is a longitudinal cross-sectional view of a monitoring device having six sliders.

FIG. 4 is a cross-sectional view of a device having six sliders with m=3 and n=2. As shown in FIG. 4, a central fixed holder 35, a front movable holder 36, and a rear movable holder 37 are fitted over a body 6. Front sliders 38 are supported by first and second arms 40, 41 between the front movable holder 36 and the fixed holder 35. Rear sliders 39 are supported by first and second arms 42, 43 between the fixed holder 35 and the rear movable holder 37. Holder connecting rods 21 movably extend through apertures 26 in the fixed holder 35 and support springs 32 for urging the front and rear movable holders 36, 37 toward each other.

Since the front movable holder 36 is biased to move rearwardly, the first and second arms 40, 41 are raised to spread the front sliders 38 radially outwardly. Likewise, since the rear movable holder 37 is biased to move forwardly, the third and fourth arms 42, 43 are raised to spread the rear sliders 39 radially outwardly. Thus, the front and rear sliders 38, 39 are pressed against the inner wall surface of the conduit 2, while the body 6 is kept centrally located in the conduit 2. The operation is substantially the same as that of the embodiment of FIGS. 2 and 3.

The sliders provided in the front and rear groups can support the body 6 more stably when the device 1 moves through a section of the conduit 2 which has a changing inside diameter.

Figure 5:
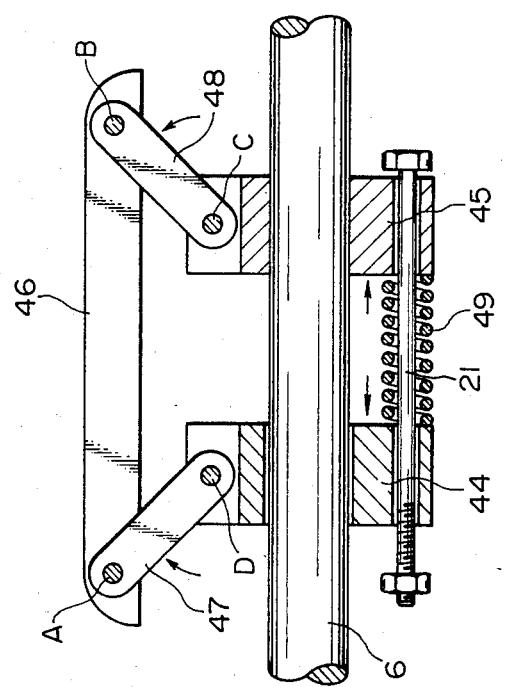
FIG. 5 is a fragmentary cross-sectional view of a monitoring device according to another embodiment, in which a spring acts to space the holders away from each other.

In the foregoing embodiments, two or more holders are disposed around the body 6 and are urged toward each other by springs to spread the sliders radially outwardly. Alternatively, springs may be disposed to normally urge the holders to move away from each other. Such an arrangement is shown in FIG. 5. As illustrated in FIG. 5, a device comprises holders 44, 45 a slider 46, a first arm 47, and a second arm 48, with a spring 49 acting between the holders 44, 45 for normally urging them to move away from each other. The slider 46 is pivotally attached to the first and second arms 47, 48 by pins A, B and the first and second arms 47, 48 are pivotably mounted on the holders 44, 45 by pins D, C. When the spring 49 is fully compressed initially, the axial distance between the pins D, C is smaller than the axial distance between the pins A, B. As the spring 49 expands, the slider 46 is moved radially outwardly.

Figure 6:
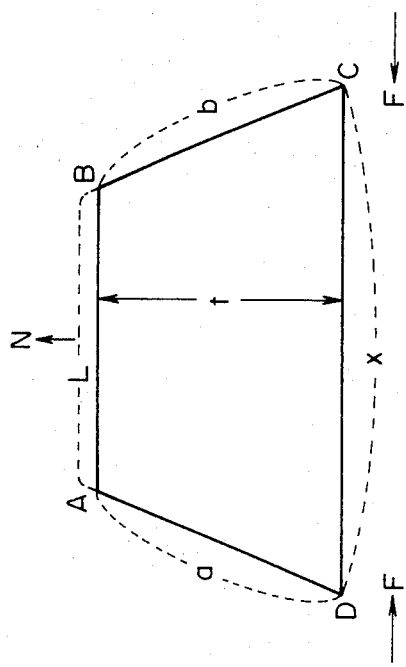
FIG. 6 is a schematic diagram of a quadrilateral formed of holders, arms, and a slider.

FIG. 6 schematically shows the holders, arms, and slider of the device shown in FIG. 5, which jointly define a quadrilateral. The points A, B, C, D represent the pins A, B, C, D, respectively, shown in FIG. 5. The pins A, D and the pins B, C are spaced apart from each other by distances a and b, respectively, and the pins A, B are spaced apart from one another by a distance L. These distances are constants, while the distance x between the pins C and D is variable.

Since the quadrilateral is variable in shape with its bottom in a fixed position, the points A, B are movable when the side CD remains in its fixed position but varies its length. No special condition between the distances a, x, b, and L need be established to bring the side AB into close contact with the conduit wall, e.g., it is not necessary for the length a to be equal to the length b.

The direction of force F of the spring 49 is defined as being positive when acting to move the points C, D toward each other. When the domain {x} for the distance x between the points C, D is greater than L, the force F may be considered positive, and when the domain {x} is smaller than L, the force F may be considered negative. Thus, $$\text{when } L < \{x\}, F > 0 \tag{I}$$

$$\text{when } L > \{x\}, F < 0. \tag{II}$$

Under the condition that the side AB is parallel to the side CD, the distance t between the sides AB, CD can be given by:

$$t = \frac{2}{y} \sqrt{s(s-a)(s-b)(s-y)} \quad (4)$$

where $$y = x - L \quad (5)$$

$$s = \frac{a+b+y}{2} \quad (6)$$

Assuming the vertical drag the slider has on the conduit wall is N, and the resilient force of the spring is F, the following relationship results from the principle of virtual work:

$$N\,dt = -F\,dx \quad (7)$$

The ratio between F and N can be derived from the equations (4) through (7). For the sake of simplicity, assume $$a = b \quad (8)$$

The spring force F is proportional to the elongation (y+a constant) of the spring, a condition which is true in the range in which Hooke's law is effective. Then, $$df = k\,dy \quad (9)$$

where k is a proportionality constant (spring constant). By integrating the equation (9), $$F = k(y + y_0) \quad (10)$$

where $y_0$ is a positive constant dependent on the position where an end of the spring is fixed. In the illustrated embodiment, this positive constant is a parameter variable by adjusting the spring support nut 27 and the retainer nut 28.

From the above equations, the vertical drag N can be expressed by the following equation:

$$N = \frac{2k(y + y_0)\sqrt{a^2 - \left(\frac{y}{2}\right)^2}}{y} \quad (11)$$

When y=0, the sides AD and BC in FIG. 6 are parallel to each other and the sides AB, BC, CD, DA constitute a rectangle. At this time, the slider is displaced to the farthest radially outward position. Since it is not preferable to displace the slider all the way to the position where y=0, the domain for y is selected to be:

$$0 < y < 2a \text{ (FIGS. 2 and 4)} \quad (I)$$
$$(L < x < L + 2a)$$
$$-2a < y < 0 \text{ (FIG. 5)} \quad (II)$$
$$(L - 2a < x < L)$$

An examination of equation (11) shows that the greater the distance that the slider is spread radially outwardly, the larger the force with which the slider is pressed against the conduit wall. Accordingly, the slider is pressed against the wall with a greater force for a conduit having a larger inside diameter.

The equation (11) diverges at the limit of y=0. Namely, the vertical drag N becomes divergent when the front and rear arms extend perpendicularly to the axis of the body to fully spread the slider. As described above, the slider is not displaced all the way to the point where y=0, but when the slider is moved to a range close to the condition of y=0, the vertical drag N varies largely with the conduit diameter. The divergence can be eliminated when $Y_0=0$, a condition in which the slider is in the farthest radially outward position when the spring is fully expanded to its free state.

The device can be used with various conduits of different inside diameters. The range in which the inside diameter of the conduit can vary is twice the length of the arms.

Figure 7:
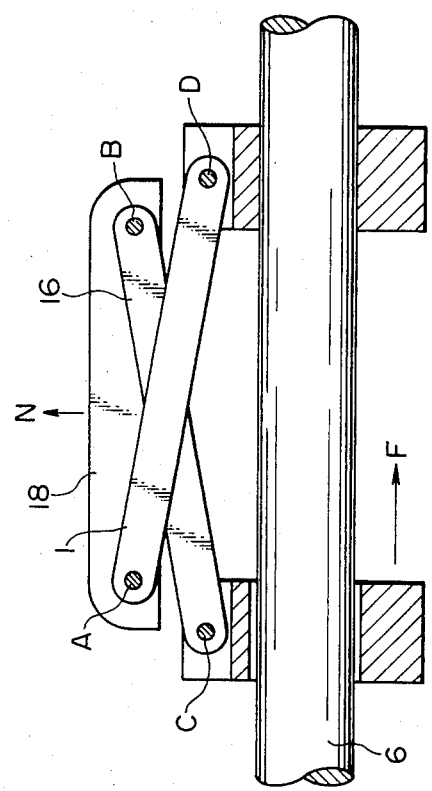
FIG. 7 is a fragmentary cross-sectional view of a monitoring device according to still another embodiment, in which crossed arms support a slider.

The arms may be crossed to support the slider resiliently as schematically shown in FIG. 7. The crossed arms can be of an increased length as such that the device can be used with conduits having a wider range of different inside diameters. In this arrangement, the slider is not displaced to a range close to y=0 at which the equation (11) diverges, and the vertical drag N varies less with the conduit diameter. With this arrangement, y is defined by $$y = x + L \quad (12)$$

The slider is employed in a region in which the distance t between the sides AB, CD is small, and the equation (11) is rewritten using t as follows:

$$N = \frac{k(2\sqrt{a^2 - t^2} + y_0)t}{\sqrt{a^2 - t^2}} \quad (13)$$

Since the arm length a is increased, the equation (13) indicates that the vertical drag N is substantially proportional to t when t is small. The slider with the crossed arms, therefore, can produce a vertical drag N which is less variable. The longer arms can adapt the device to conduits having a wider range of different inside diameters.

Although no holder connecting rod and spring are shown in FIG. 7 for the sake of brevity, the two holders are in fact coupled by a holder connecting rod and are normally urged toward each other under the resilient force of a spring.

The two crossed arms may appear less suitable for maintaining the body parallel to the conduit. However, the crossed arms can provide parallelism between the body and the conduit as with the embodiments as shown in FIGS. 2 through 5. The body and the conduit are kept parallel to each other, and the body is supported centrally in the conduit at all times. Such parallelism cannot be proved geometrically in a simple enough manner to warrant inclusion herein, but it can be derived mechanically from balanced bending moments for the trapezoid configurations with the arms not crossed as shown in FIGS. 2 through 6, or with the crossed arms as shown in FIG. 7.

In the embodiment of FIG. 7, the body 6 contains an image transmission fiber and a light guide for transmitting illumination light, and has a rotatable monitoring detector for detailed observation of the interior of a conduit being monitored. The body 6 may be replaced with a cable itself, provided the cable has a sufficient degree of rigidity.

Figure 8:
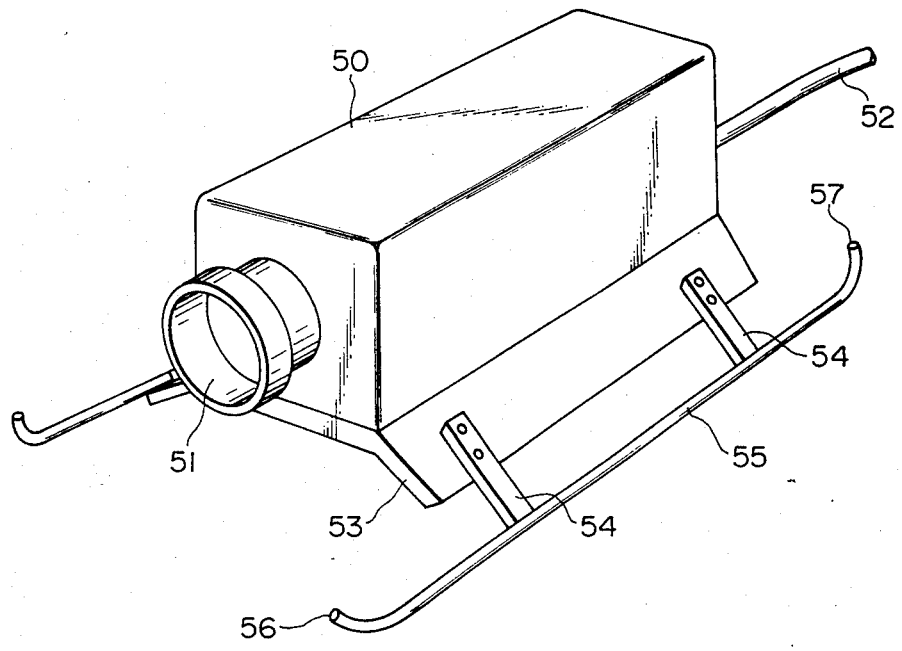
FIG. 8 is a perspective view of a conventional conduit inspection television camera having two fixed feet.
Figure 9:
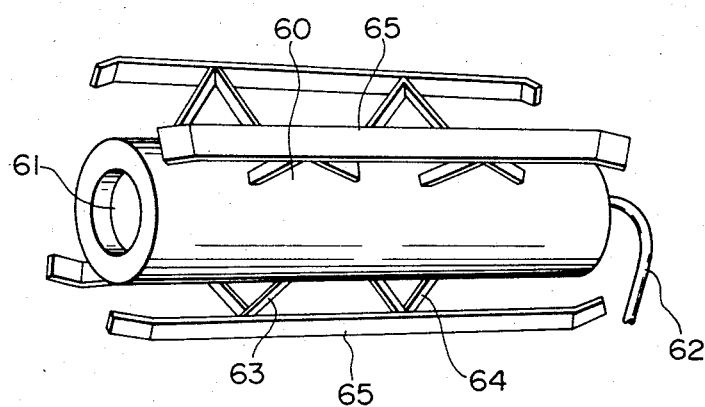
FIG. 9 is a perspective view of a conventional conduit inspection television camera having four fixed feet.

The monitoring detector may be of any of a number of known mechanisms, the present invention residing in that the body is resiliently supported centrally in the conduit by the sliders. The monitoring detector may comprise a conventional television camera as shown in FIGS. 8 and 9. Instead of directly transmitting an image, the television camera converts the image into electric signals which are transmitted over the electric wire cable. Where the television camera is employed, the body contains a power supply, a photoelectric transducer and the like.

With the arrangement of the present invention, the detector and the body in a device for monitoring the interior of a conduit can be held in alignment with the central axis of the conduit at all times.

The device can be used equally well with conduits of different inside diameters, since the arms are pivotably moved to contract or spread the sliders in conformity with various inside diameters. The sliders can also be contracted or spread in conformity with different sections of a single conduit which have varying inside diameters. When the device runs into an obstacle in the conduit being inspected thereby, the sliders can be contracted radially inwardly to move over the obstacle for smooth back-and-forth movement. The present invention is therefore highly advantageous.

What is claimed is:

1. A device for monitoring the interior of a conduit, said device comprising:
   a body;
   a plurality of sliding members supported on said body for slidably engaging an interior surface of said conduit; and
   a resilient mechanism for urging said sliding members for equal amounts of radially outward movement from said body toward said interior surface, wherein each said sliding member has first and second ends and wherein said resilient mechanism comprises:
   a first member having a fixed position with respect to a direction substantially parallel to an axis of said conduit;
   a second member movable with respect to said first member, in said direction substantially parallel to said axis of said conduit;
   a plurality of first arms each pivotably connected at one end to said first member and at another end to a respective one of said sliding members;
   a plurality of second arms each pivotably connected at one end to said second member and at another end to a respective one of said sliding members; and
   bias means for urging said first and second members for relative movement along said movement direction to urge said sliding members away from said body.

2. A monitoring device according to claim 1, wherein said plurality of sliding members comprises at least three sliding members.

3. A monitoring device according to claim 2, wherein said sliding members are positioned at substantially equal angular intervals around the periphery of said body.

4. A monitoring device according to claim 1, wherein said bias means comprises at least one connecting rod secured at one end to said first member and passing through said second member, and a spring member secured to said rod at its other end and urging said second member toward said first member.

5. A monitoring device according to claim 1, wherein each said first arm is pivotably connected to its respective sliding member at a first position and each said second arm is pivotably connected to its respective sliding member at a second position which is closer than said first position to said first member, said resilient mechanism urging said first and second members toward one another.

6. A monitoring device according to claim 1, wherein said body contains an image transmission fiber and a light guide for transmitting illumination light.

7. A monitoring device according to claim 1, further comprising a monitoring detector carried on said body and having a field of view rotatable about an axis of said body.

8. A monitoring device according to claim 1, wherein each said first arm is pivotably connected to its respective sliding member at a first position and each said second arm is pivotably connected to its respective sliding member at a second position which is closer than said first position to said second member.

9. A monitoring device according to claim 8, wherein said first and second positions are separated by a distance L and said first and second arms are pivotably secured to said first and second members at positions separated by a distance x which is variable and always greater than L, said bias means urging said first and second members toward one another.

10. A monitoring device according to claim 8, wherein said first and second positions are separated by a distance L and said first and second arms are pivotably secured to said first and second members at positions separated by a distance x which is variable and always less than L, said bias means urging said first and second members away from one another.

11. A monitoring device according to claim 1, wherein said plurality of sliding members comprises a plurality of groups of sliding members, said groups being offset with respect to one another along an axis of said body and each group including a plurality of sliding members disposed at substantially equal intervals about said axis of said body.

12. A monitoring device according to claim 11, wherein each group of sliding members includes at least three sliding members.

13. A monitoring device according to claim 12, wherein said plurality of sliding members consists of two groups with each group consisting of three sliding members, whereby a total of six sliding members are provided.

14. A device for monitoring the interior of a conduit, said device comprising:
   a body;
   a plurality of sliding members supported on said body for slidably engaging an interior surface of said conduit; and
   a resilient mechanism for urging said sliding members for equal amounts of radially outward movement from said body toward said interior surface, wherein each said sliding member has first and second ends and wherein said resilient mechanism comprises:
   first and second members movable with respect to one another in a movement direction substantially parallel to an axis of said conduit;

a plurality of first arms each pivotably connected at one end to said first member and at another end to a respective one of said sliding members;

a plurality of second arms each pivotably connected at one end to said second member and at another end to a respective one of said sliding members; and bias means for urging said first and second members for relative movement along said movement direction to urge said sliding members away from said body, wherein said bias means comprises at least one connecting rod secured at one end to said first member and passing through said second member, and a spring member secured to said rod at its other end and urging said second member toward said first member.

* * * * *